United States Patent
Wong (10) Patent No.: US 9,746,936 B2
(45) Date of Patent: Aug. 29, 2017

(54) REMOTE CONTROLLER

(71) Applicant: DONGGUAN SILVERLIT TOYS CO., LTD., Dongguan (CN)

(72) Inventor: Kwok Leung Wong, Causeway Bay (HK)

(73) Assignee: DONGGUAN SILVERLIT TOYS, CO., LTD., Dongguan (CN)

( * ) Notice: Subject to any disclaimer, the term of this patent is extended or adjusted under 35 U.S.C. 154(b) by 0 days.

(21) Appl. No.: 14/970,307

(22) Filed: Dec. 15, 2015

(65) Prior Publication Data

US 2017/0168587 A1    Jun. 15, 2017

(51) Int. Cl.

| | |
|---|---|
| *G05B 11/01* | (2006.01) |
| *G06F 3/02* | (2006.01) |
| *G08C 17/02* | (2006.01) |
| *G08C 23/04* | (2006.01) |
| *G08C 23/02* | (2006.01) |

(52) U.S. Cl.
CPC ............... *G06F 3/02* (2013.01); *G08C 17/02* (2013.01); *G08C 23/02* (2013.01); *G08C 23/04* (2013.01); *G08C 2201/30* (2013.01)

(58) Field of Classification Search
CPC .................................. G06F 3/02; G06F 3/0414
USPC .......................................................... 340/12.2
See application file for complete search history.

(56) References Cited

U.S. PATENT DOCUMENTS

| | | | |
|---|---|---|---|
| 8,013,550 B1* | 9/2011 | Young ..................... | A63H 19/24 246/187 A |
| 2008/0211707 A1* | 9/2008 | Park ......................... | E05B 19/22 341/176 |
| 2010/0127914 A1* | 5/2010 | Maier ..................... | G08C 23/04 341/176 |

* cited by examiner

*Primary Examiner* — Vernal Brown
(74) *Attorney, Agent, or Firm* — Greenberg Traurig, LLP (57) ABSTRACT

A controller includes a substrate is fixed relative to a movable plate. When a movement or an input operation on the movable plate or surface is detected, a drive signal is directed to drive electrodes or elements related to the substrate. The drive signal is modulated with signals dependent on the location of the movable plate. The movable plate is part of a including a plate being flat plate-like in shape. A movable plate support section supports the movable plate on a support structure so as to permit the movable plate to be moved along a plane lateral and parallel to the plate surface of the movable plate. An actuator is configured to respond to the movable plate; an actuator drive control section for outputting an actuator drive signal to drivingly control a sensor as signaled by the actuator drive control section.

16 Claims, 11 Drawing Sheets

REMOTE CONTROLLER

BACKGROUND

This generation, most children are familiar with the control method of electronic smart device such as gesture and drag control. Joystick control has become outdated design now.

In present disclosure, there is a low cost remote controller whereby users such as children can experience the drag feeling on a tablet or smart phone like a remote controller without applying resistive or capacitive screen hi-end technology.

SUMMARY

There is provided a plate device including a movable plate including a plate being flat plate-like in shape. A support section is configured to support the movable plate on a support structure so as to permit the movable plate to be moved along a plane parallel to the plate surface thereof. An actuator is configured to communicate movement of the movable plate to a sensor to provide an output to drivingly control an MCU when the movable plate moves along the plane parallel to the plate surface thereof. The tactile movement generated by a user's fingertip making contact with and moving the plate surface thereby acts to operate the MCU and the controller.

The plate device is configured to generate a signal from movement of the user's fingertip operating the display, which can be transmitted to movement transmitters and sensors, which also have the function as a controller for a remote control device and for a toy which is operated by a remote controller.

The plate input device has a flexibility as not to be obtainable with input devices using mechanical switches, or other complex system such as piezo electric or LCD systems.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

The features and advantages of the present disclosure will become apparent from the following description read in conjunction with the accompanying drawings, in which like reference numerals designate the same elements.

An input device includes a movable plate and a support. The input device through transmitters electrically, magnetically or optically through magnetic, IR or RF signals detects a movement between the movable plate and the support when the movable plate is moved laterally. This provides information to a processing device such as a microprocessor signaling circuit about the moved position.

One or more components of the movable plate, the support and the like can be formed of a transparent plastic material. When a position on the movable plate is moved for an input operation, the relative position is conveyed to the processing device.

The processing device generates control signals which can be IR, RF or ultrasonic and acts as a transceiver for similar signals with a remote controllable device such as a remote controlled toy. The plate input device provides for freely and finely controlling a remote controller.

The input device comprises a movable plate including an input operation surface on its surface. There is a support for supporting the movable plate. A movement transmitter detects movement and a moved position on the input operation surface of the movable plate relative to the support. Movement position data is communicated to four spaced drive electrodes or elements on a substrate or extension which is in a fixed relative to the plate. The electrodes or elements relate this movement to sensors fixed on a base relative to the movable plate or the support. As such, a movement is communicated as a drive signal to the sensors, which is in turn is directed to an MCU to signal the particular movement of the movable plate and thereby to generate an input operation when a movement is detected by the sensors.

When the movable plate moves, a changing drive signal to the sensors provides the movement information of the movable plate.

At peripheral location, selectively the corners of the movable plate, at peripheral locations of the movable plate there are spring biasing elements for urging the plate back to a position of repose, namely a position when movement action is not applied to the movable plate. At each of four corners there can be respective spring mechanism, and each mechanism can have two arms, one arm of each spring extending along adjacent sides of the movable plate. Where the corner is at 90 degrees, the spring has two arms at 90 degrees to each other.

The input device for the movement detection impresses a detecting signal on any one or more sensors magnetically, electrically or optically through a transmitter to a sensor which is also located at the movable plate peripheral edge.

The transmitters and sensors are in a sense located above or below each other in a sandwich fashion. In some forms the protruding part from the movable plate can be between the sensors and transmitters and thereby form a system for communication of plate movement between the transmitters and sensors.

Because the sensor is connected with the peripheral edge of the movable plate, the plate itself can be a relatively simple plate without internal or embedded electronics.

The movable plate and a support can be made at least of partly transparent material for transmitting ambient or emitted light from a light-emitting element for illumination provided on a rear side of the plate and/or support.

The movable plate can act through the MCU to operate sound for representing a movement of the movable plate.

A plate input device for a controller comprises a movable plate; an input operation surface on a surface of the movable plate; a support for the movable plate; a movement transmitter for detecting a lateral movement and a lateral moved position on the input operation surface based on a contact and movement of the plate. There is a sensor and a signal detection system operable to read a movement of the transmitter. The movement relates to the movement of the movable plate, and the sensor applies a drive signal to a signal processor responsive to the movement. The movement of the plate is translated as a drive signal to the processor and the movement generates a reaction from the signal generator in reaction to the input movement operation, and the reaction being a signal to or from the controller.

The movement from a moved position is at a value proportional to a distance from a position of repose of the moveable plate. The sensor provides moved position data indicating a position of the movement. The support for the plate includes a frame for housing the plate, and movable devices for permitting movement of the plate in the frame. The transmitter includes at least one and selectively at least four transmitter electrodes or transmitter elements fixed on an extended surface from the plate. At least one and selectively at least four sensors or receivers elements fixed on a surface substantially parallel to the extension from the plate, and wherein the sensors respond to at least one and selectively at least four of the electrodes or transmitter elements.

Spring members are placed at a location between an internal periphery of the frame and between an edge of the movable plate, the spring members acting to urge the plate to a position of repose. The movement transmitters impress a detecting signal on respective sensors and at least one of electrically, magnetically or optically affects a signal to the sensors commensurate with the movement of the transmitters and the movement of the plate.

The transmitters are located is fixedly on an extension on the plate. The movable plate and selectively the support, are made of at least partly transparent material for transmitting emitted light from a background or light-emitting element provided relative to the plate. Selectively the device is transparent from the top surface of the plate, and through the plate, and the device is free of a backing material under the plate other than the frame around the plate.

The device includes a movable plate; an input operation surface on a surface of the movable plate; a support for the movable plate. The movement transmitter detects a lateral movement and a lateral moved position on the input operation surface based on a contact and movement of the plate; a sensor and a signal detection system operable to read a movement of the transmitter. The movement relates to the movement of the movable plate, and the sensor applies a drive signal to a signal processor responsive to the movement. Movement of the plate is translated as a drive signal to the processor and the movement generates a reaction from the signal generator in reaction to the input movement operation, and the reaction being a signal to or from the controller. The substrate movement transmitters detect a lateral movement of the surface relative to a position of repose of the plate. The signal detection circuit is operable to read a change in at least one of electrical, magnetic or optical relationship formed by the relative change of position of the transmitters and sensors.

The change of the position is at a value proportional to a distance from a side of the moveable plate; providing moved position data indicating a position of the movement; and applying a drive signal from the sensors responsive to the movement.

The substrate includes at least one and selectively at least four transmitter electrodes or transmitter elements fixed on an extended surface from the plate, including at least one and selectively at least four sensors or receivers elements fixed on a surface substantially parallel to the extension from the plate.

The sensors respond to at least one and selectively at least four of the electrodes or transmitter elements, and spring members placed at a location between an internal peripheral frame and between an edge of the movable plate, the spring acting to urge the plate to a position of repose.

A plate input device comprises a movable plate, an input operation surface on a first surface of the movable plate; a support for the movable plate. The movable plate is mounted for lateral movement relative to the support. The first surface is for effecting tactile movement of the movable plate. A substrate is affixed to the plate, the substrate having driving transmitters or electrodes which move as the plate moves. The substrate movement transmitters are for detecting a lateral movement of the surface relative to a position of repose of the plate. Sensors are provided for receiving the signals from the transmitters. A signal detection circuit is operable to read a change in at least one of electrical, magnetic or optical relationship formed by the relative change of position of the transmitters and sensors. The change of the position is at a value proportional to a distance from a side of the moveable plate; providing moved position data indicating a position of the movement; and applying a drive signal from the sensors responsive to the movement. The movement of the substrate is in response to the plate movement generates a control signal to a signal processor, and the signal processor generates a control signal as a remote control signal selectively for a toy.

A plate device comprises a movable plate including a housing for supporting the movable plate so as to permit the movable plate to move laterally relative to the housing. An actuator is configured to respond to the movable plate to output an actuator drive signal to a signal control processor. The actuator moves relative to a sensor laterally as the plate moves laterally within the housing such that a tactile movement generated on a user's fingertip making contact with the plate surface of the movable plate transposes to plate movement. The actuator simultaneously drives a movement generating to a sensor, and in turn a signal is generated to the processor.

The movable plate is fixed in the housing between multiple spring devices to urge the plate into a position of repose in the support structure. The actuator drive control signal generates different signals from the user's fingers making contact with the plate surface of the movable plate.

A controller comprising a casing or frame, and a movable plate, a movable spring loaded support for supporting the movable plate on a support structure in the casing or frame to permit the movable plate to move laterally relative to a base of the frame. An actuator driver is configured to signal a signal processor in the controller casing in response to the movable plate lateral movement within the support. The actuator driver outputs an actuator drive signal, and the movable plate movement translates a tactile action generated by a user's fingertip moving the plate surface of the movable plate. The signal processor generates a responsive signal for controlling a remote device by optical, radio or acoustic signals.

The movable plate is fixed on the casing or frame. The actuator is mechanically connected to the movable plate.

There is a method of operating a controller including a casing or frame, and a movable plate, a movable spring loaded support for supporting the movable plate on a support structure in the casing or frame. The method comprises moving the plate laterally relative to the frame, signaling through an actuator in the controller casing a signal in response to the movable plate lateral movement within the casing. Then there is generated an actuator drive control signal for translating a tactile action generated by a user's fingertip moving the movable plate. A responsive signal is generated for controlling a remote device by optical, radio or acoustic signals.

The remote controller comprises:
1. Top frame
2. Transparent plastic plate for drag purpose
3. Spring mechanism for returning transparent plastic plate to home position
4. A button for Auxiliary control
5. Infrared (IR) sensor module to detect the slide movement direction of transparent plastic plate
6. A MCU for receiving the movement signal from sensor module or button signal from Auxiliary control and transmitting the control signal to remote toys through IR, radio frequency or ultrasound media
7. Bottom frame
8. Batteries A transparent plastic plate is held between the top and bottom frame. This plate can be slid in any direction relative to the top and bottom frame. There is a small protruded plate, in which the central area surface has reflective material, at the lower side of transparent plastic plate. Below this small plate, there is an IR sensor module comprising of four IR transmitters and one photoelectric sensor. The IR transmitters are distributed orthogonally and corresponding to Forward, Backward, Left and Right direction control while the photoelectric sensor is located at the center.

Figure 7:
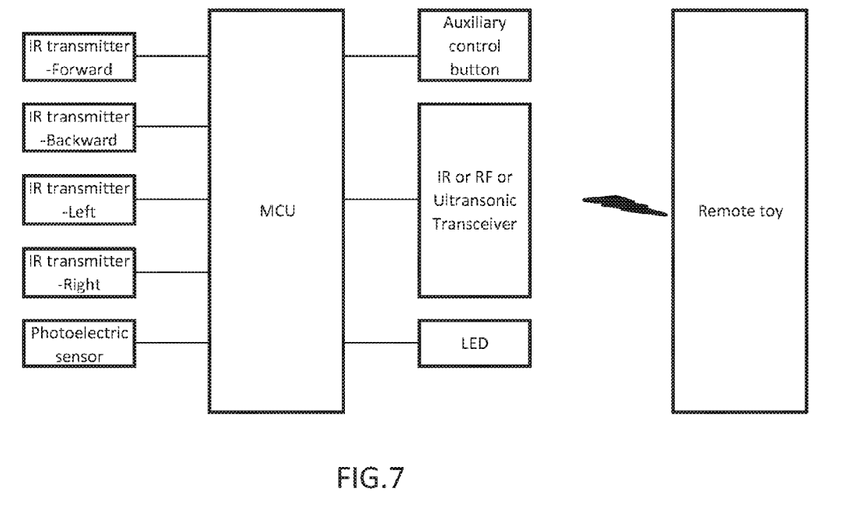
FIG. 7 is a block diagram of the control system.
Figure 8:
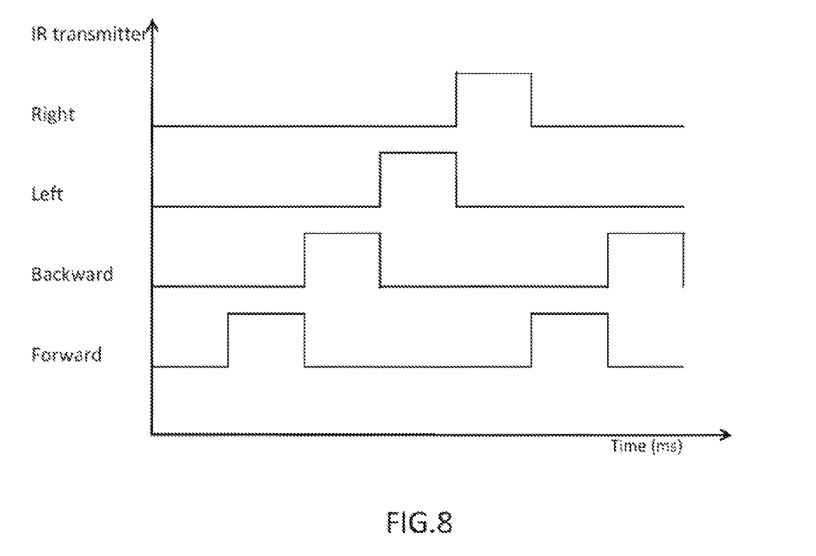
FIG. 8 is a timing diagram of the control system.

By using polling method, MCU sends an IR signal cyclically in sequence through the 4 IR transmitters i.e.
1. Send out IR signal through Forward transmitter
2. Send out IR signal through backward transmitter
3. Send out IR signal through Left transmitter
4. Send out IR signal through Right transmitter
5. Send out IR signal through Forward transmitter
6. This can be repeated or varied as needed to operate the controller When the transparent plastic plate is in home position, the small protruded plate is just aligned on top of photoelectric sensor. It is not able to reflect the IR signal from any IR transmitter to sensor.

Figure 1A:
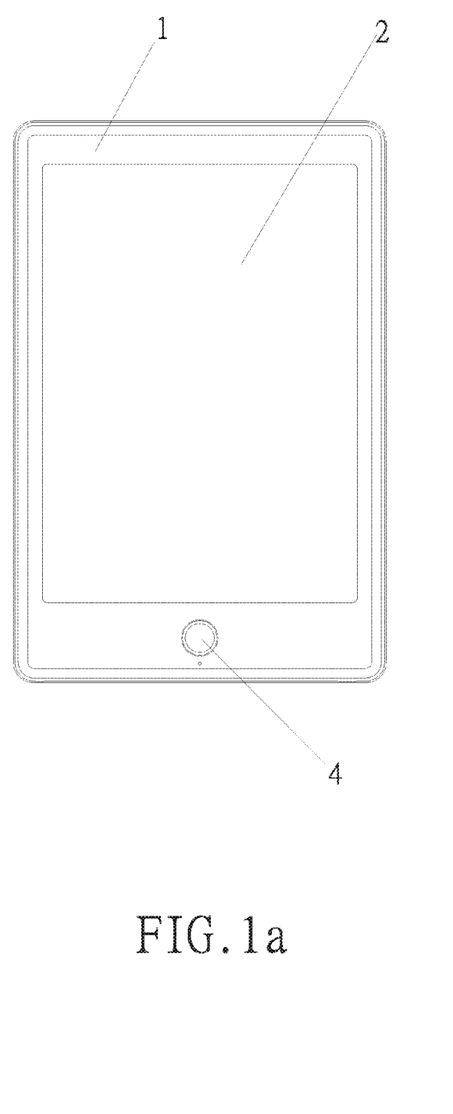
FIGS. 1a and 1b respectively are a top and a side view of the remote controller.
Figure 1B:
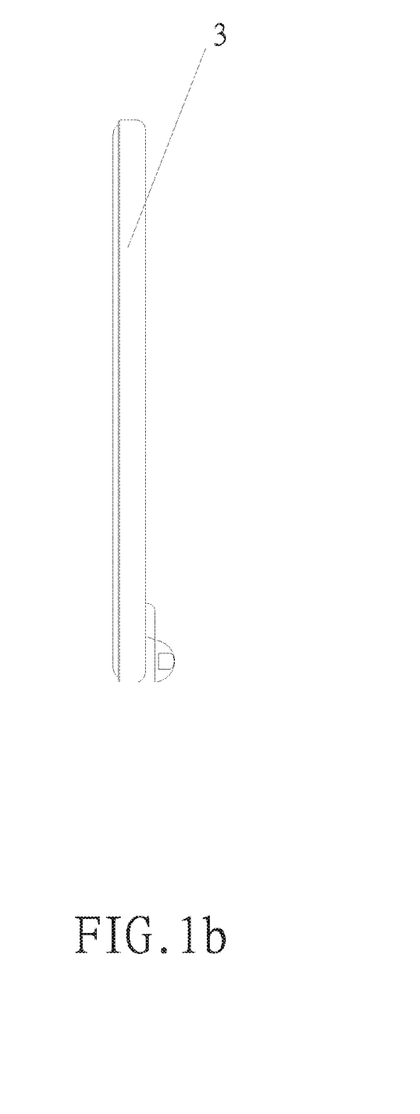
Figure 2:
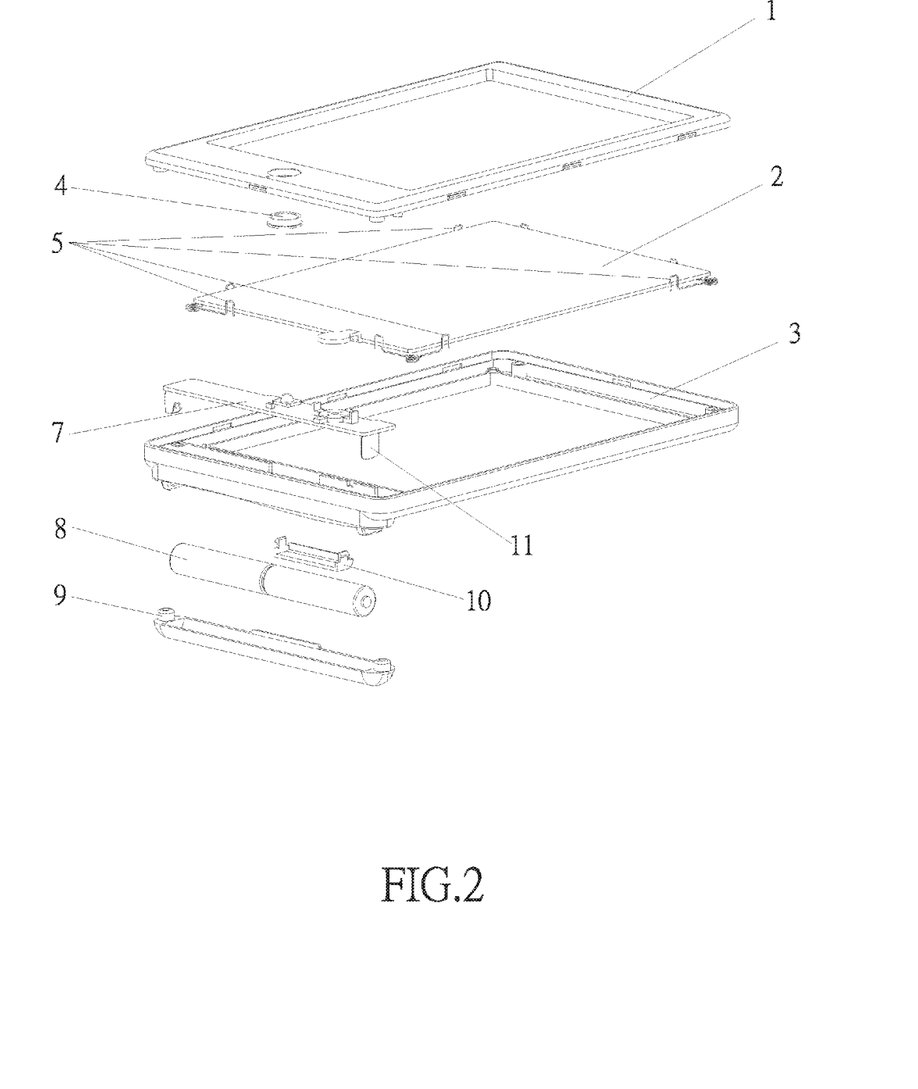
FIG. 2 is an exploded view of the remote controller.
Figure 3A:
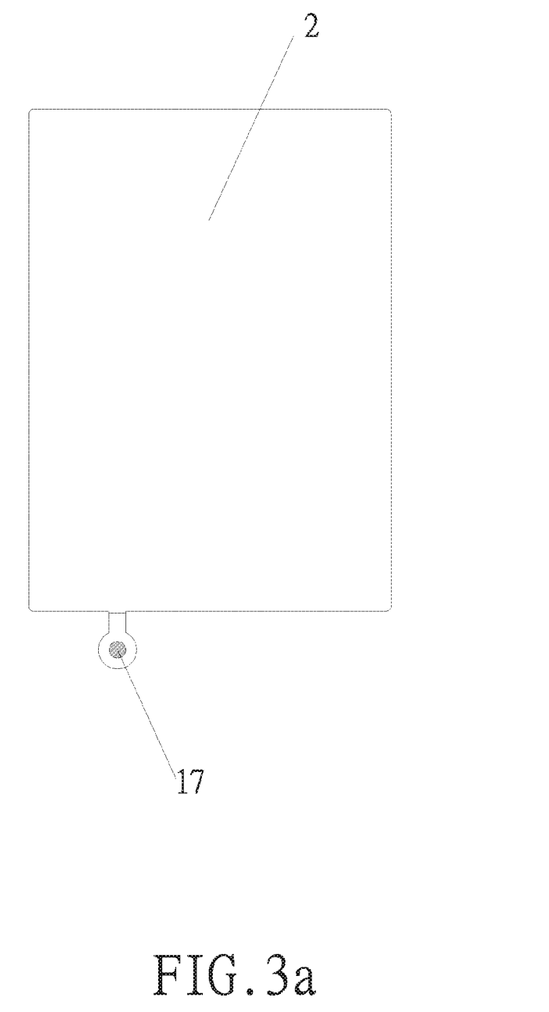
FIGS. 3a and 3b respectively are a top side view of the transparent plastic plate.
Figure 3B:
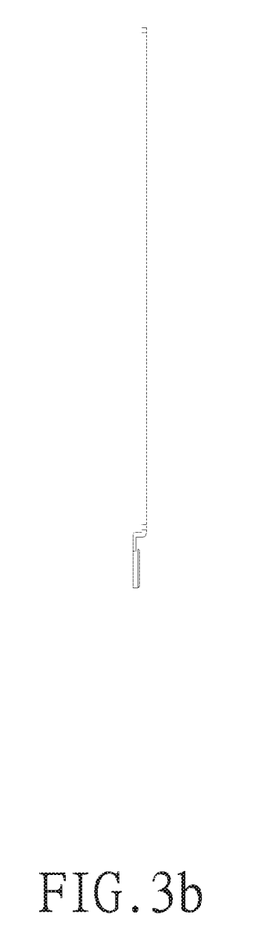
Figure 4A:
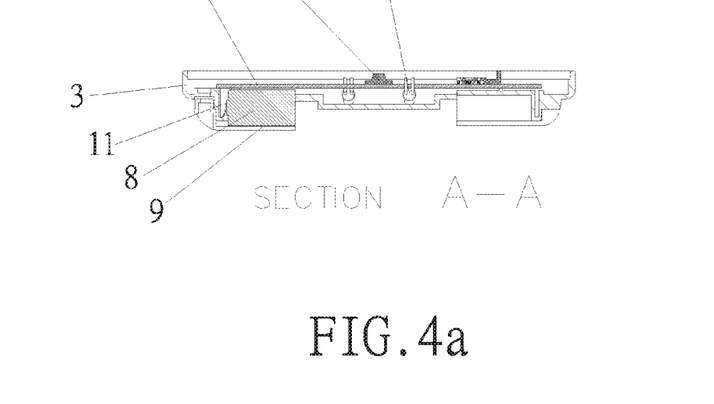
FIGS. 4a and 4b respectively are an exploded and cross-sectional view of the bottom frame.
Figure 4B:
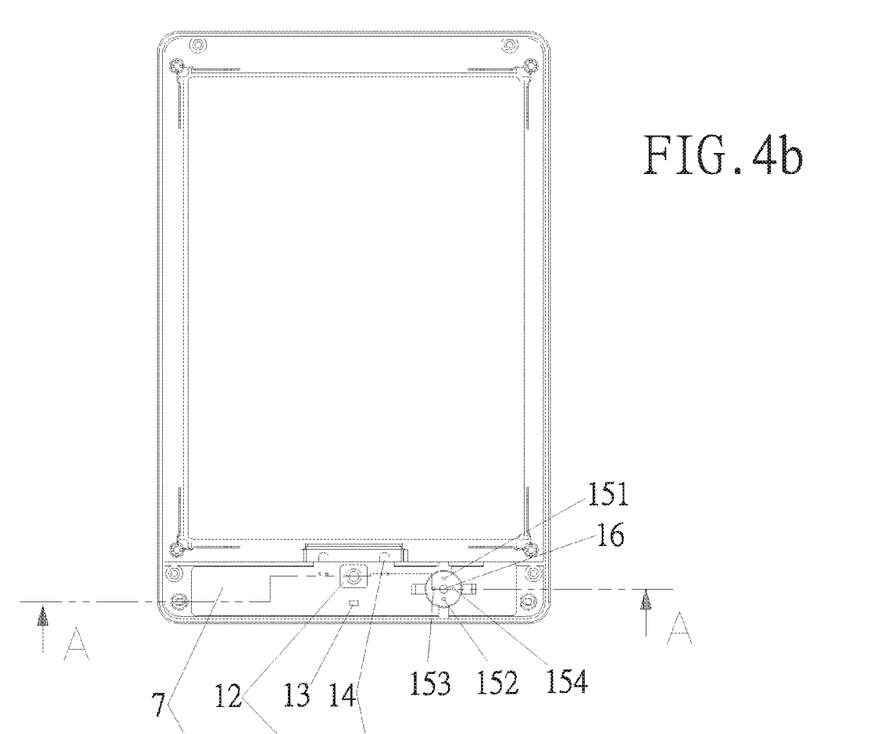
Figure 5A:
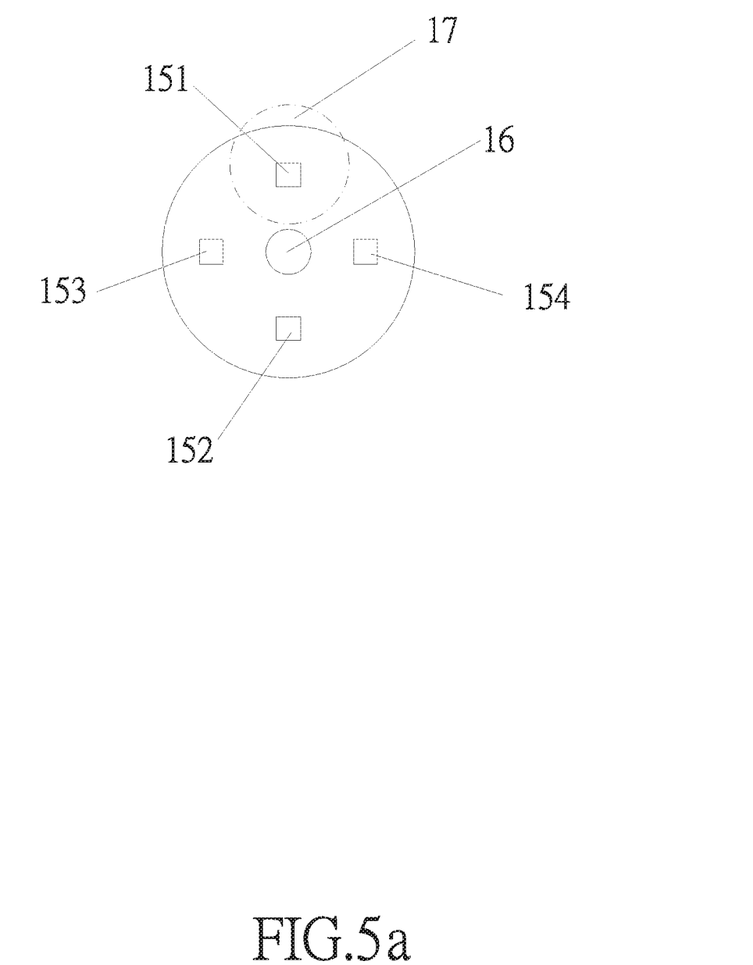
FIG. 5a is an exploded view to show the protruded plate in forward position.

If the transparent plastic plate is slid to Forward position, the protruded plate and therefore the reflective surface will be moved towards Forward transmitter. The IR ray from Forward transmitter can be reflected to sensor. Then MCU can realize that this is a forward command.

Figure 5B:
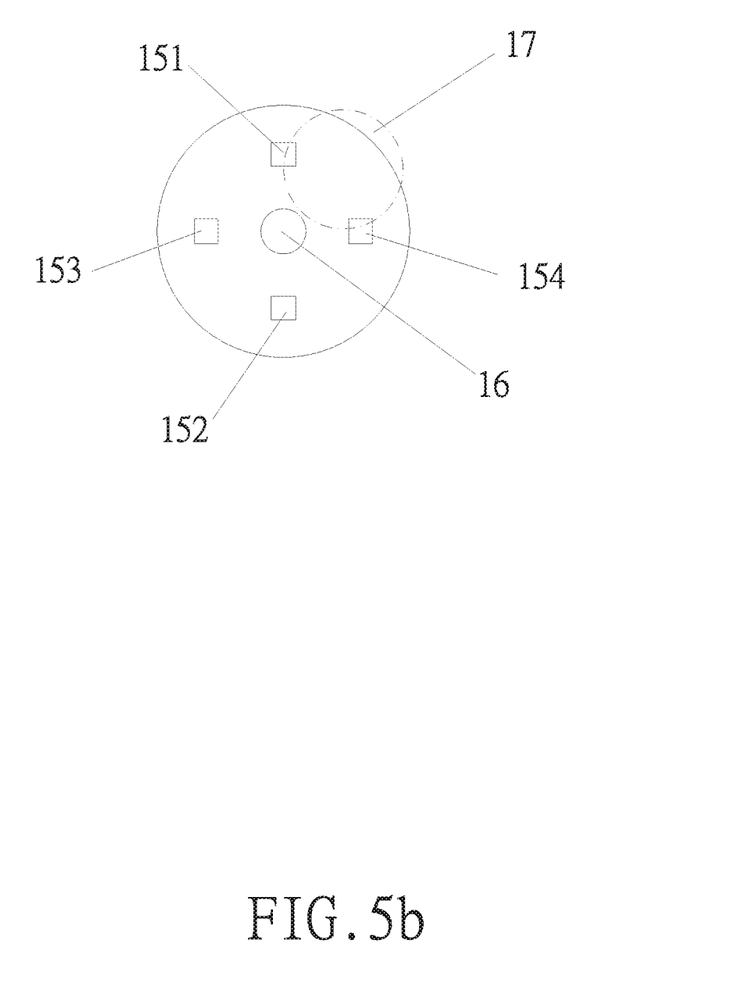
FIG. 5b is an exploded view to show the protruded plate in forward/right position.
Figure 6A:
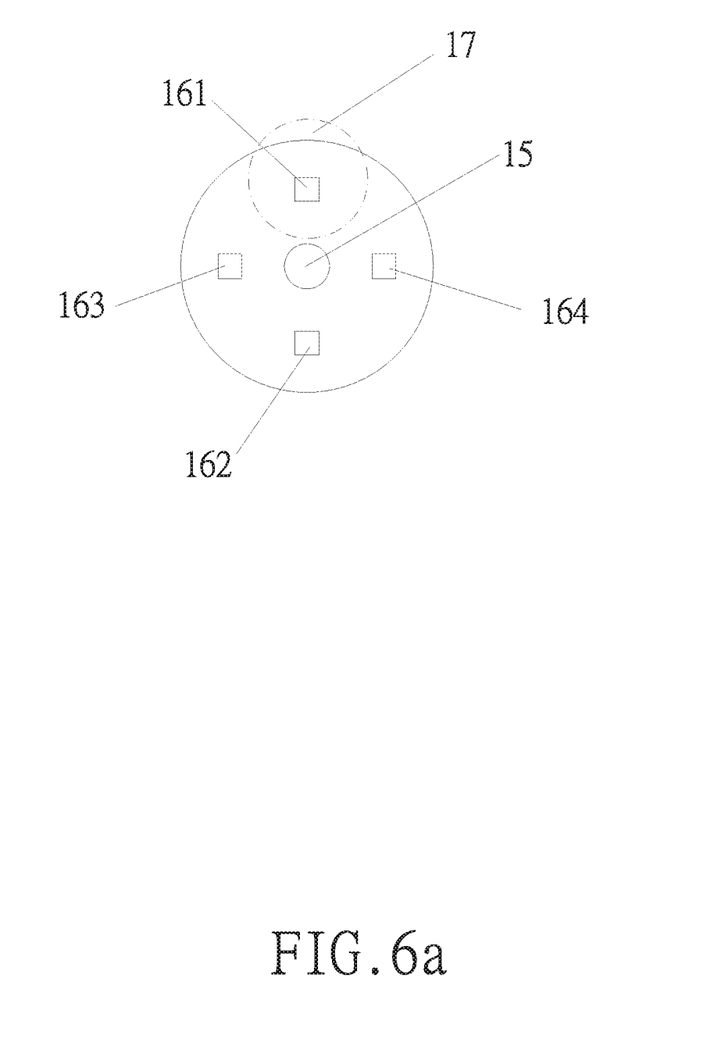
FIG. 6a is an exploded view to show an alternative design in which the sensor module comprises of one IR transmitter with four photoelectric sensors.
Figure 6B:
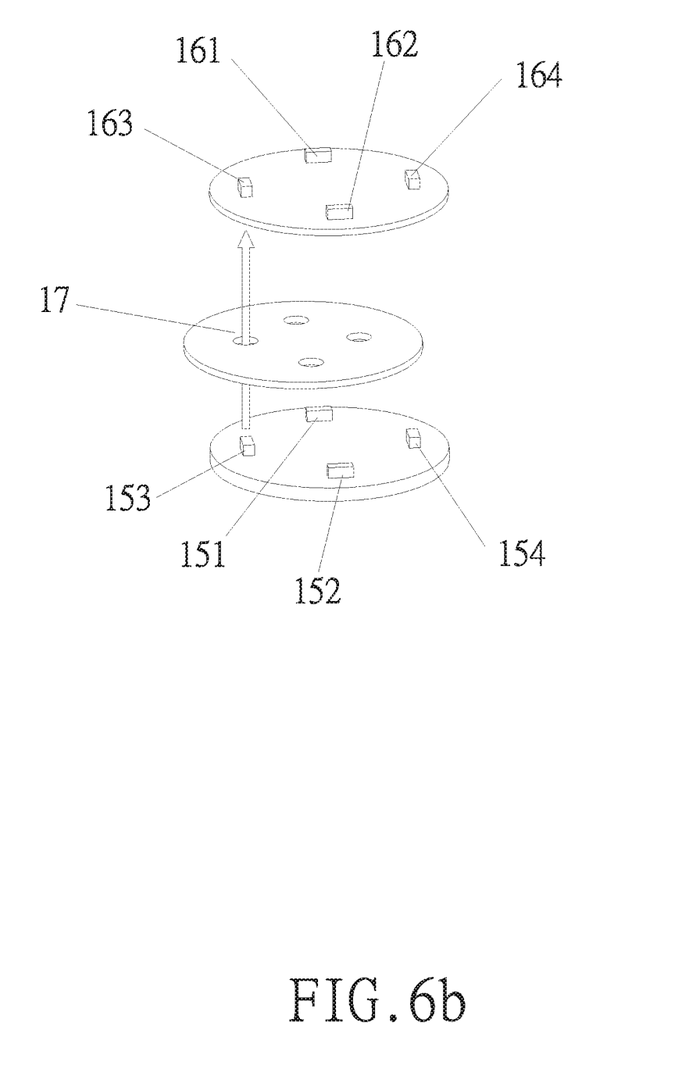
FIG. 6b is an exploded view to show an alternative design in which the sensor module comprises of IR sensor system with through-beam type.
Figure 6C:
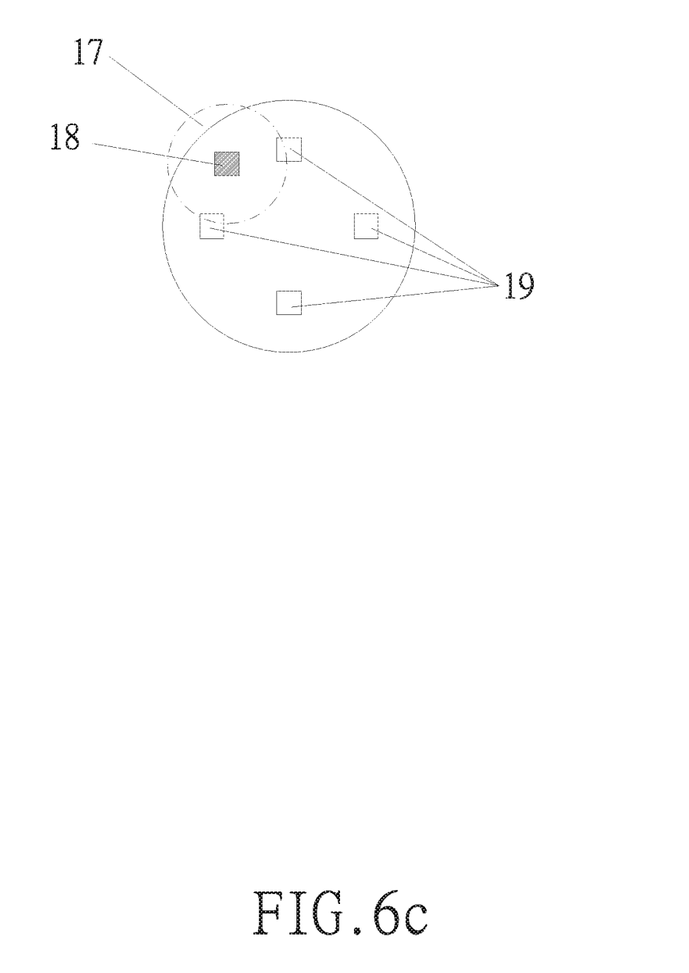
FIG. 6c is an exploded view to show an alternative design in which the sensor module comprises of four magnetic sensors and a magnet.
Figure 6D:
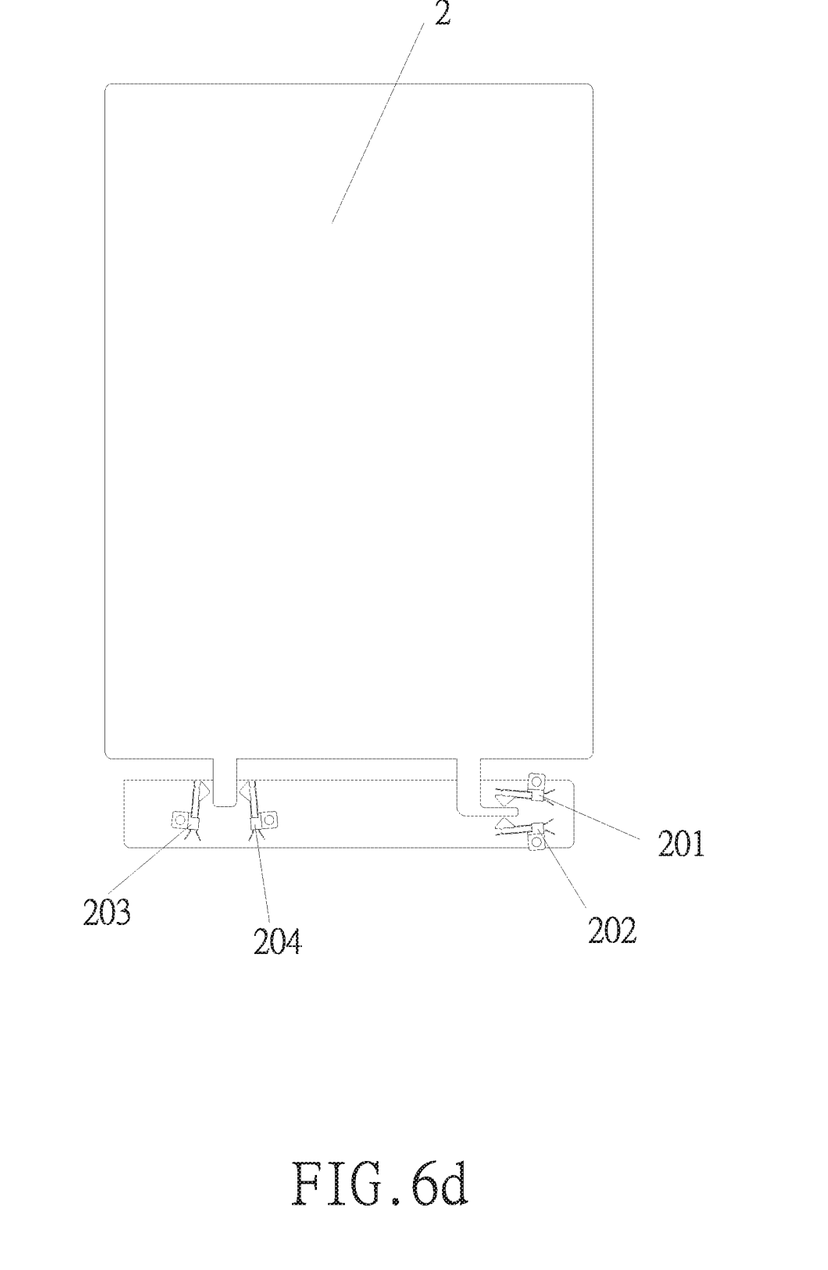
FIG. 6d is an exploded view to show an alternative design in which the sensor module comprises of four switches.

Similarly, if the transparent plastic plate is slid to Forward/Right position, both Forward IR signal and Right IR signal will be reflected to sensor. As a result MCU will response these 2 signals by sending out and Forward Right control command to remote control toy.

After releasing the transparent plastic plate, it will return to home position by those springs on each corner.

The Auxiliary control button can be assigned for headlight control. Press this button for activating the headlight of a remote control toy vehicle.

The LED can act as the power and/or battery low indicator. In current disclosure, the sensor module is reflective type. In other design, it can be
1. One IR transmitter with four photoelectric sensors
2. IR sensor system with through-beam type.
3. Four magnetic sensors instead of IR
4. Four switches instead of IR

NUMBERING SYSTEM

| No | Description |
|---|---|
| 1 | Top frame |
| 2 | Transparent plastic plate |
| 3 | Bottom frame |
| 4 | Auxiliary button key top |
| 5 | Spring |
| 7 | Electronic board |
| 8 | Batteries |
| 9 | Battery door |
| 10 | Infrared lens cover |
| 11 | Battery contact |
| 12 | Button |
| 13 | LED |
| 14 | IR emitting diode - Send command to remote toys |
| 15 | IR transmitter |
| 151 | IR transmitter - Forward |
| 152 | IR transmitter - Backward |
| 153 | IR transmitter - Left |
| 154 | IR transmitter - Right |
| 16 | Photoelectric sensor |
| 161 | Photoelectric sensor - Forward |
| 162 | Photoelectric sensor - Backward |
| 163 | Photoelectric sensor - Left |
| 164 | Photoelectric sensor - Right |
| 17 | Protruded plate |
| 18 | Magnet |
| 19 | magnetic sensor |
| 201 | Switch - Forward |
| 202 | Switch - Backward |
| 203 | Switch - Left |
| 204 | Switch - Right |

While the device, apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The plate input device uses a conventional plate input device without changing its constitution, and simply movable fixed to a base. The extension from the plate provides the element for being the input device for communicating the movement of the plate.

Both the movable plate and selectively the support can be formed with a transparent material. The operator can move the input operation surface of the plate while seeing other displayed content on or through the plate. The moved position is detected, and instructions being input data corresponding to the movement and/or displayed content are provided for the MCU processing device.

The movable plate is placed on the support frame. There can be one or more light-emitting elements for illumination such as a light-emitting diodes placed on the surface of the support or frame. When the movement on the movable plate is detected for the first time, the drive signal may be communicated on the extended portion to the transmitters and sensors The device and method is described with reference to a tablet type analog plate input device. There may be one or more substrates with the frame and movable plate frame may be fixed to the front surface or the rear surface of the movable plate as long as it has a certain degree of stiffness. The movable plate may be made of any material such as glass, plastic, or metal as long as it has sufficient stiffness or structure to generate movement of the plate under finger action.

Different mounting devices for the plate are possible and different spring structures are possible on two or four edges relative to the frame. Movement is transmitted to the individual transmitters and sensors depend on distances from a moved position to the fixed positions. It is possible to detect the moved position by comparing the outputs from the sensors.

The input plate device can be configured by software. In addition, the plate device has a number of merits such as lightweight and compact configurations obtainable and a low occurrence of mechanical failure.

Having described embodiments of the disclosure with reference to the accompanying drawings, it is to be understood that the disclosure is not limited to those precise embodiments, and that various changes and modifications may be effected by one skilled in the art without departing from the scope or spirit of the disclosure as defined in the appended claims.

The invention claimed is:

1. A plate input device for a controller, the device including a movable plate; an input operation surface on a surface of the movable plate; a support for the movable plate; a movement transmitter for detecting a lateral movement and a lateral moved position on the input operation surface based on a contact and movement of the plate; a sensor and a signal detection system operable to read a movement of the transmitter, the movement relating to the movement of the movable plate, and the sensor being for applying a drive signal to a signal processor responsive to the movement, whereby movement of the plate is translated as a drive signal to the processor and the movement generates a reaction from the signal generator in reaction to the input movement operation, and the reaction being a signal to or from the controller, wherein the support for the plate includes a frame for housing the plate within an outer perimeter of the frame, and a movable device within the perimeter of the frame for permitting forward, backward, left and right movement of the plate within the perimeter of the frame.

2. A plate input device according to claim 1, wherein the movement from a moved position is at a value proportional to a distance from a position of repose of the moveable plate; and the sensor provides moved position data indicating a position of the movement.

3. The plate input device according to claim 1, including multiple movable devices, each device comprising a spring member placed at a location between an internal periphery of the perimeter of the frame and between a perimeter edge of the movable plate to engage an edge of the plate, the spring members acting to urge the plate to a position of repose.

4. The plate input device according to claim 3, wherein the transmitters are located fixedly on an extension on the plate, the extension extending beyond a perimeter defined by the perimeter of the plate and beyond an area defined between the spring members engaging the edge of the plate.

5. The plate input device according to claim 1, wherein the movable plate and selectively the support, are made of at least partly transparent material for transmitting emitted light from a light-emitting element for illumination provided relative to the plate, and selectively wherein the device is transparent from the top surface of the plate, and through the plate, and the device is free of a backing material under the plate other than the frame around the plate.

6. A plate input device for a controller, the device including a movable plate; an input operation surface on a surface of the movable plate; a support for the movable plate; a movement transmitter for detecting a lateral movement and a lateral moved position on the input operation surface based on a contact and movement of the plate; a sensor and a signal detection system operable to read a movement of the transmitter, the movement relating to the movement of the movable plate, and the sensor being for applying a drive signal to a signal processor responsive to the movement, whereby movement of the plate is translated as a drive signal to the processor and the movement generates a reaction from the signal generator in reaction to the input movement operation, and the reaction being a signal to or from the controller, wherein the support for the plate includes a frame for housing the plate within an outer perimeter of the frame, and multiple movable devices within the perimeter of the frame and the movable devices being for engaging a perimeter edge of the plate, each of the multiple movable devices being mounted at different locations relative to the perimeter edge of the plate thereby permitting movement of the plate within the perimeter of the frame, and wherein the transmitter includes at least one and selectively at least four transmitter electrodes or transmitter elements fixed on a lateral surface extending laterally from the surface from the plate, and the extended surface being beyond the perimeter edge of the plate engaged by the movable devices.

7. A plate input device according to claim 6, including at least one and selectively at least four sensors or receiver elements fixed on a surface substantially parallel to the extension from the plate, and wherein the sensors respond to at least one and selectively at least four of the electrodes or transmitter elements, the four sensors being for responding to movement in each of four respective different orthogonal directions.

8. The plate input device according to claim 6, wherein the movement transmitters impress a detecting signal on respective sensors and at least one of electrically, magnetically or optically affects a signal to the sensors commensurate with the movement of the transmitters and the movement of the plate.

9. A plate input device for a controller, the device including a movable plate; an input operation surface on a surface of the movable plate; a support for the movable plate; a movement transmitter for detecting a lateral movement and a lateral moved position on the input operation surface based on a contact and movement of the plate; a sensor and a signal detection system operable to read a movement of the transmitter, the movement relating to the movement of the movable plate, and the sensor being for applying a drive signal to a signal processor responsive to the movement, whereby movement of the plate is translated as a drive signal to the processor and the movement generates a reaction from the signal generator in reaction to the input movement operation, and the reaction being a signal to or from the controller, the movement transmitters being for detecting a lateral movement of the surface relative to a position of repose of the plate, the signal detection circuit being operable to read a change in at least one of electrical, magnetic or optical relationship formed by the relative change of position of the transmitters and sensors, wherein the change of the position is at a value proportional to a distance from a side of the moveable plate; providing moved position data indicating a position of the movement; and applying a drive signal from the sensors responsive to the movement, at least one and selectively at least four transmitter electrodes or transmitter elements fixed on an extended surface from the plate, including at least one and selectively at least four sensor or receiver elements fixed on a surface substantially parallel to the extension from the plate, wherein the support for the plate includes a frame for housing the plate within an outer perimeter of the frame, and spring members within the perimeter of the frame for permitting forward, backward, left and right movement of the plate within the perimeter of the frame, and wherein the sensors respond to at least one and selectively at least four of the electrodes or transmitter elements, and the spring members being placed at a location between an internal peripheral frame and between an edge of the movable plate, the spring members acting to urge the plate to a position of repose.

10. The plate input device according to claim 9, wherein: the movable plate and selectively the support are made of at least partly transparent material for transmitting emitted light from a rear side of the support.

11. A plate input device comprising a movable plate, an input operation surface on a first surface of the movable plate; a support for the movable plate, the movable plate being mounted for lateral movement relative to the support; the first surface being for effecting tactile movement of the movable plate, wherein the support for the plate includes a frame for housing the plate within an outer perimeter of the frame, and movable devices within the perimeter of the frame for permitting forward, backward, left and right movement of the plate within the perimeter of the frame, a substrate affixed to the plate and extending from a peripheral edge of the plate, the substrate having driving transmitters or electrodes which move as the plate moves, the substrate movement transmitters being for detecting a lateral movement of the surface relative to a position of repose of the plate, sensors for receiving the signals from the transmitters, a signal detection circuit operable to read a change in at least one of electrical, magnetic or optical relationship formed by the relative change of position of the transmitters and sensors, wherein the change of the position is at a value proportional to a distance from a side of the moveable plate; providing moved position data indicating a position of the movement; and applying a drive signal from the sensors responsive to the movement, whereby the movement of the substrate in response to the plate movement generates a control signal to a signal processor, and the signal processor generates a control signal as a remote control signal selectively for a toy.

12. A plate device comprising a movable plate including a housing for supporting the movable plate, the moveable plate having four spaced apart corners so as to permit the movable plate to move laterally relative to the housing; an actuator configured to respond to the movable plate to output an actuator drive signal to a signal control processor; wherein the actuator moves relative to a sensor laterally as the plate moves laterally within the housing such that a tactile movement generated on a user's fingertip making contact with the plate surface of the movable plate transposes to plate movement, and the actuator simultaneously drives a movement generating to a sensor, and in turn a signal is generated to the processor, wherein the movable plate is fixed in the housing between multiple spring devices located at the four corners of the plate to urge the plate into a position of repose in the support structure.

13. The plate device according to claim 12, wherein the actuator drive control signal generate different signals from the user's fingers making contact with the plate surface of the movable plate.

14. A controller comprising a casing or frame, and a movable plate, a movable spring loaded support for supporting the movable plate on a support structure in the casing or frame to permit the movable plate to move laterally relative to a base of the frame, wherein the casing or frame houses the plate within an outer perimeter of the frame or casing, and movable devices within the perimeter of the frame for permitting forward, backward, left and right movement of the plate within the perimeter of the casing or frame when finger action is applied to a surface of the plate to move the plate from a position of repose with the casing or frame, and the movable devices being for permitting return of the plate to the position of repose on release of the finger pressure on the plate, an actuator driver being configured to signal a signal processor in the controller casing in response to the movable plate lateral movement within the support, the actuator driver outputting an actuator drive signal, the movable plate movement being for translating a tactile action generated by a user's fingertip moving the plate surface of the movable plate, and the signal processor generates a responsive signal for controlling a remote device by optical, radio or acoustic signals.

15. The plate device according to claim 14, wherein the actuator is mechanically connected to the movable plate.

16. A method of operating a controller including a casing, and a movable plate, a movable spring loaded support for supporting the movable plate on a support structure in the casing or frame wherein the casing houses the plate within an outer perimeter of the casing, and the movable spring loaded supports within the perimeter of the casing for permitting forward, backward, left and right movement of the plate within the perimeter of the casing when finger action is applied to a surface of the plate to move the plate from a position of repose with the casing, and the movable spring loaded supports being for permitting return of the plate to the position of repose on release of the finger pressure on the plate, comprising the steps of moving the plate laterally relative to the casing, signaling through an actuator in the controller casing a signal in response to the movable plate lateral movement within the casing, generating an actuator drive control signal for translating a tactile action generated by a user's fingertip moving the movable plate, and generating a responsive signal for controlling a remote device by optical, radio or acoustic signals.

* * * * *